Patented Oct. 21, 1941

2,259,601

UNITED STATES PATENT OFFICE 2,259,601

ABRASIVE CERAMIC GRANULES

Dennis C. Asper, Aspers, Pa.

No Drawing. Application January 9, 1939,
Serial No. 250,067

3 Claims. (Cl. 51—307)

The invention, generally considered, relates to non-slip surfaces, and more particularly to abrasive ceramic granules which are suitable for use in the construction of such surfaces.

Heretofore, considerable difficulty has been encountered in the construction of non-slip terrazzo and mosaic surfaces. In ordinary terrazzo and mosaic work, marble chips have generally been used as their wear resisting properties are good and they are available in a variety of colors. However, marble chips are not practicable for all purposes as when ground to provide an even surface, they are very smooth and have little frictional resistance. Accordingly, when a non-slip surface was required, it was necessary either to find some material in which were combined both frictional resistance or high coefficient of friction and the various colors of marble chips or to abandon the coloring in favor of the frictional or abrasive property.

Numerous types of non-slip surfaces have been suggested, ranging from unground marble chips to powdered abrasives of various sorts. Of the many types suggested, the most feasible would seem to be those in which abrasive grains are united into larger bodies by a suitable binder before being incorporated in the surface. The abrasive bodies form non-slip surfaces of varying degrees of excellence but for terrazzo and mosaic they have a common fault. To provide the necessary frictional resistance, it has been considered essential that the predominant materials in the bodies, or at least in their wearing surfaces, should be abrasive grains, the binder merely serving to unite the grains. Consequently, the color of the bodies is that of the abrasive material and the latitude of design and color permissible by the use of marble chips cannot be obtained in non-slip terrazzo and mosaic.

Another objection to frictional or abrasive bodies, in which the abrasive material predominates, is that the cost of the abrasive is so high, as compared with that of the binder and of marble chips, that a non-slip flooring constructed of these bodies is prohibitively expensive except in the most necessary applications.

It is, therefore, the primary object of the invention to provide abrasive ceramic granules which are predominantly of ceramic materials but have sufficient frictional resistance for use in non-slip surfaces, the granules thus combining the characteristics of both marble chips and the abrasive bodies heretofore in use.

Another object of the invention is to provide abrasive ceramic granules of various colors which are homogeneous both in color and abrasive content throughout, the coloring being obtained either by use of ceramic materials having inherent color characteristics or by mixing with the ceramic materials certain coloring agents, thereby permitting a terrazzo surface constructed of the granules to be ground smooth without detriment either to its color scheme or non-slip properties.

Yet another object of the invention is to provide abrasive ceramic granules of either natural or colored ceramics which can be produced at a cost considerably below that of abrasive bodies commonly in use, said granules being equally resistant to wear and, depending upon the abrasive material used, acid resistant as well.

The above and other objects will hereinafter appear in the detailed description of the invention and be particularly pointed out in the appended claims.

In producing the abrasive ceramic granules of this invention, the first step is the selection of the ceramic materials. The materials selected will of course depend upon the color, cohesion and adhesion, firing temperature and other properties required of the ceramic ingredients but in general the usual combinations of clays and fluxes, such as kaolin, flint and feldspar are suitable. The selected materials are then placed in a pug mill, Lancaster mixer or other suitable mixer. Abrasive material, either in powdered or granular form, and sufficient water to permit plasticizing of the ceramic materials are added to the mixer and the mass is then pugged or mixed until the various ingredients are thoroughly commingled into a homogeneous mass.

It may be found that the ceramic materials are too coarse to be readily mixed. In such an event it will be necessary to pulverize the materials before placing them in the mixer. This can be accomplished by various means. The materials can be ground, either dry or wet, in a ball mill or other suitable device or can be subdivided by the flotation process. If one of the means is used in which water has to be present, the pulverized mass or filter cake may have sufficient plasticity before it is placed in the mixer, precluding the necessity of adding water to the mixer. Another advantage of this preliminary step is that the ceramic materials are mixed into a substantially homogeneous mass during pulverization.

A number of materials are suitable for use as the abrasive material in the granules of the present invention. These include carborundum, crystalline aluminum oxides, such as emery and corundum, and other materials of an equivalent degree of hardness. In addition to its hardness, a further property may be required of the abrasive material. Vitrified ceramic products are impervious to the action of most acids and if the granules are to be exposed to acid, the same acid resistance is required of the abrasive. In this case but few of the available abrasive materials can be used since aluminum oxide is attacked by acids and of those specifically mentioned, only carborundum is acid resistant.

Whatever the abrasive material used, the amount added will vary between about ten per cent (10%) and thirty per cent (30%) by weight of the ceramic materials. Less than ten per cent (10%) of abrasive does not provide the granule with sufficient frictional resistance to enable it to be used in a non-slip surface. The presence of more than thirty per cent (30%) of abrasive will tend to cloud or obscure the ceramic materials in the granules with consequent impairment of their usefulness in terrazzo and mosaic work.

If the ceramic and abrasive materials are mixed in a pug mill, they will be extruded through dies at the extrusion end of the mill at the completion of the mixing operation. A die of a particular size and shape is not essential. It is usually preferable to use dies of fairly small cross-sectional area to facilitate subsequent drying and crushing of the extruded strips, rods or pencils, but larger pieces may be extruded if desired.

After the materials are removed from the mixer they are dried to a substantially bone dry state. The rods, strips or other shapes of dried material are then crushed, ground or otherwise formed in a suitable manner into granules, bodies, or particles of the desired size and shape. It is preferable at this stage to separate the fines from the larger granules by sifting or screening. If the fines are not desired they may be returned to the pug mill or other mixer and mixed with a subsequent batch of material. However, as a market seems to exist for the fines they will only be so returned in the exceptional case in which it is requisite that larger granules alone be produced.

Before drying, the extruded material may be led or introduced into a de-airing machine by which, as its name denotes, substantially all of the captured air is removed and the mixed material compacted into a non-porous mass. The ultimate function performed by the de-airing is the curtailment of warpage caused by the expansion of the captured air during firing. This is not so important in the production of granules as when the materials are molded or otherwise formed into bodies of particular shapes. However, the de-airing step is of value in that the granules do not expand on firing, permitting the size of the ultimate aggregate to be controlled by the extent of the grinding.

In the next step the granules or ground materials are placed in a kiln of the continuous rotary, or other suitable type, in which the requisite temperature and rapidity of firing can be obtained. The temperature at which the granules are fired necessarily varies in accordance with the ceramic ingredients of the granules. However, as the firing temperatures of the various ceramic materials are well known it is not considered necessary nor is it possible to state a definite firing temperature for all granules.

It is not always desirable to continue the firing until the granules are vitrified. Complete vitrification will produce hard granules which cannot be readily ground. Thus, when excessive hardness of ceramic ingredients is not required it is preferable to interrupt the firing after the granules have been only partially vitrified to facilitate grinding of the terrazzo or mosaic surfaces in which the granules are subsequently laid.

During firing some surface fusion or cohesion between the granules or particles will usually take place particularly if the granules are of small size such as fines. The resultant clinker or agglomeration of granules is of no value and must be broken down into individual particles. This can be accomplished by running or passing the clinker between rolls or similar devices by which sufficient pressure is exerted to break or rupture the bonds between the granules and thereby disintegrate the clinker.

After the firing or disintegration of the clinker, if the latter is formed, the vitrified or partially vitrified granules are finally graded by screening or other separating means into aggregate of the desired sizes.

The predominance of the ceramic materials in the granules is of particular importance when the granules are to be used in terrazzo or mosaic as the ceramic materials, and not the abrasive, are determinative of the color of the granules. In some instances white or colorless granules produce the desired effect and many natural ceramic materials are suitable for this purpose. In others, colored granules are required. Such granules can be obtained by the use of selected ceramic materials having inherent color characteristics or if the desired colors are not inherent in the available material, certain coloring agents can be mixed with the ceramic material. Since the various coloring agents and the color produced by each are well known in the art, but a few need here be mentioned. For a green color the coloring agent is ordinarily $Cr_2O_3$; for red $Fe_2O_3$; for black MnO; for chocolate a combination of the above chemicals producing red and black; for gray chromate of iron; for blue cobalt, either the carbonate or the oxide; for buff rutile or prepared buff stains; for yellow, varieties of ochre or yellow body stains; for pink, pink stains or calcined Japanese ochre; for orchid a combination of the above mentioned pink and blue producing ingredients; and for cream rutile or cream body stains. The mixing will ordinarily be accomplished by adding the stain or coloring agent to the other materials in the pug mill or mixer. Alternatively, if the ceramic materials are first pulverized, the stain can be added during pulverization, although this is not necessary as the mixing in the pug mill is sufficiently thorough to diffuse the stain and produce a homogeneous mass.

Granules prepared in accordance with the above process have varied uses. They have a high coefficient of friction, can be given any desired color, are vary hard and consequently resistant to wear, and, depending upon the incorporated abrasive material, are acid resistant as well. Their coloring and high coefficient of friction particularly suit them for use in non-slip terrazzo and mosaic whether monolithic or constructed of individual blocks. In both types of terrazzo, the granules will ordinarily be mixed with an appropriate binder such as Portland cement before being either laid in situ on a prepared foundation or applied to the surfaces of precast blocks of various materials. Alternatively, the cement may be first laid and the granules rolled into it before the cement has set or the granules may be embedded in the surfaces of the precast blocks during the casting. Whether the granules are first mixed with a binder or are embedded in a previously laid binder or a block during casting, coloring agents may be mixed with the binder or material from which the block is prepared to form a colored background for the granules or otherwise carry out the desired color scheme. The hardness of the granules adapts them for use in wear resistant surfaces either in place of or mixed with marble chips which are relatively soft. The granules may also be mixed with other materials depending upon the purpose of the finished product, requisite cost, and other circumstances of a particular application.

The granules are especially useful in surfaces which are to be ground smooth after they have set, as is usual in floorings, since their homogeneity both in color and abrasive content permits a surface formed of the granules to be ground without deleterious effect on either its pattern or non-slip quality. The given applications are merely illustrative of the uses for which the properties of the granules render them particularly suitable as many others will be readily apparent.

From the foregoing disclosure it is apparent that there has been provided an abrasive ceramic granule which is of wide application and which granules can be manufactured simply and inexpensively. It will be understood that the disclosed granules are merely exemplifications of the principles involved and the right is reserved to make such changes in the form and substance of the granules as will not depart from the spirit of the invention or the scope of the appended claims.

Having now described my invention, what I claim is:

1. An abrasive granule comprising a homogeneous predominantly ceramic mixture of ceramic materials and an abrasive, the abrasive content of said mixture being not greater than 30%.

2. A colored abrasive granule for use in wear resistant terrazzo comprising a fired homogeneous predominantly ceramic mixture of ceramic materials, abrasive and coloring matter, said abrasive forming not greater than 30% of said mixture.

3. An abrasive granule comprising a homogeneous predominantly ceramic mixture of ceramic materials and an abrasive, said abrasive forming between 10% and 30% of said mixture.

DENNIS C. ASPER.